No. 812,160. PATENTED FEB. 6, 1906.
T. S. WILKES.
CHANGE MAKING MACHINE.
APPLICATION FILED DEC. 22, 1904.

10 SHEETS—SHEET 1.

Witnesses
C. Munter
C. H. Griesbauer

Inventor
Thomas S. Wilkes,
by H. B. Willson
Attorney

No. 812,160. PATENTED FEB. 6, 1906.
T. S. WILKES.
CHANGE MAKING MACHINE.
APPLICATION FILED DEC. 22, 1904.

10 SHEETS—SHEET 2.

Fig. 2

Witnesses:
C. Munter
C. H. Griesbauer

Inventor
Thomas S. Wilkes
by H. B. Wilson
Attorney

No. 812,160. PATENTED FEB. 6, 1906.
T. S. WILKES.
CHANGE MAKING MACHINE.
APPLICATION FILED DEC. 22, 1904.

10 SHEETS—SHEET 6.

Witnesses
C. Munter
C. H. Giesbauer

Inventor
Thomas S. Wilkes
by H. R. Wilson
Attorney

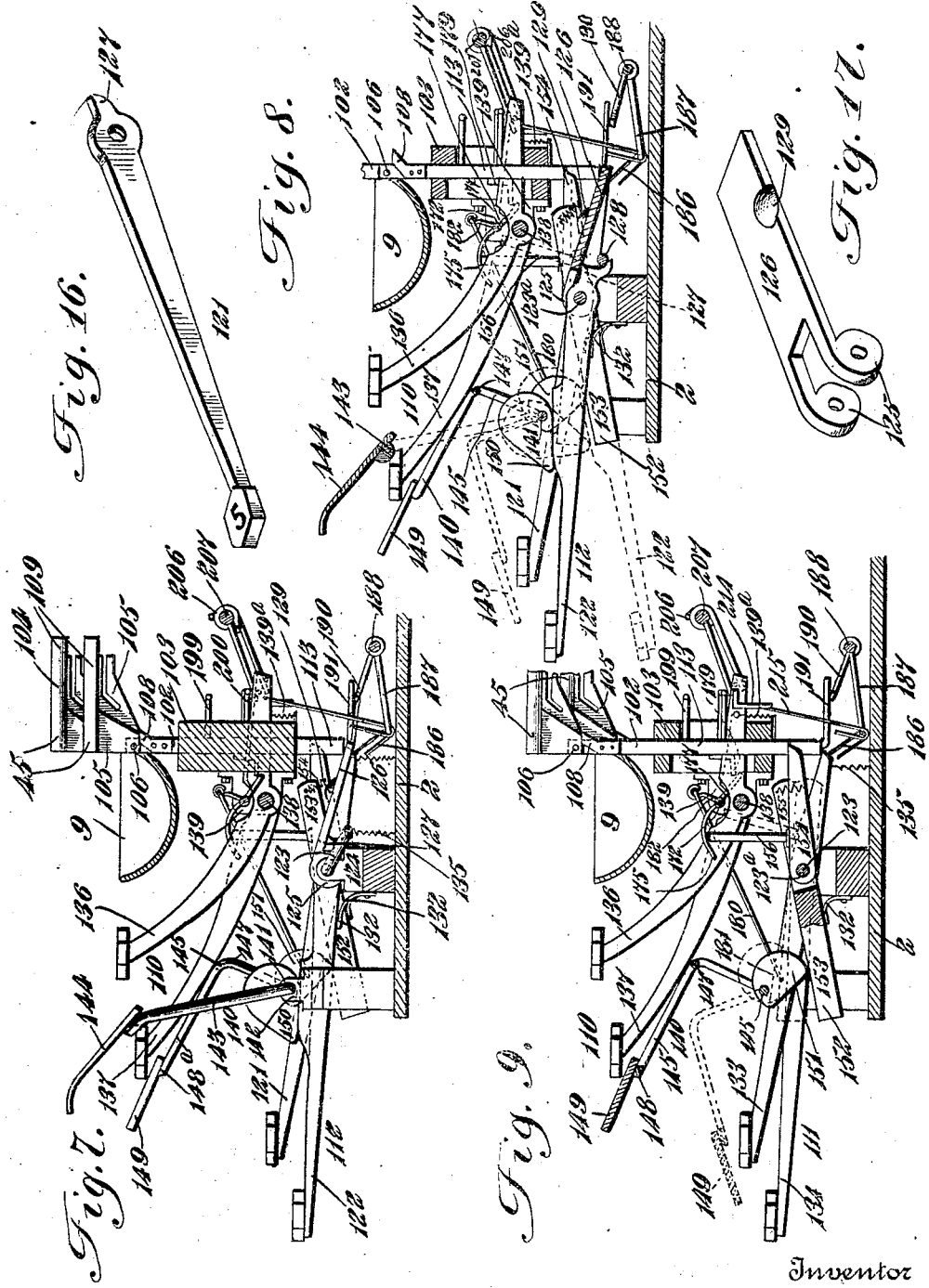

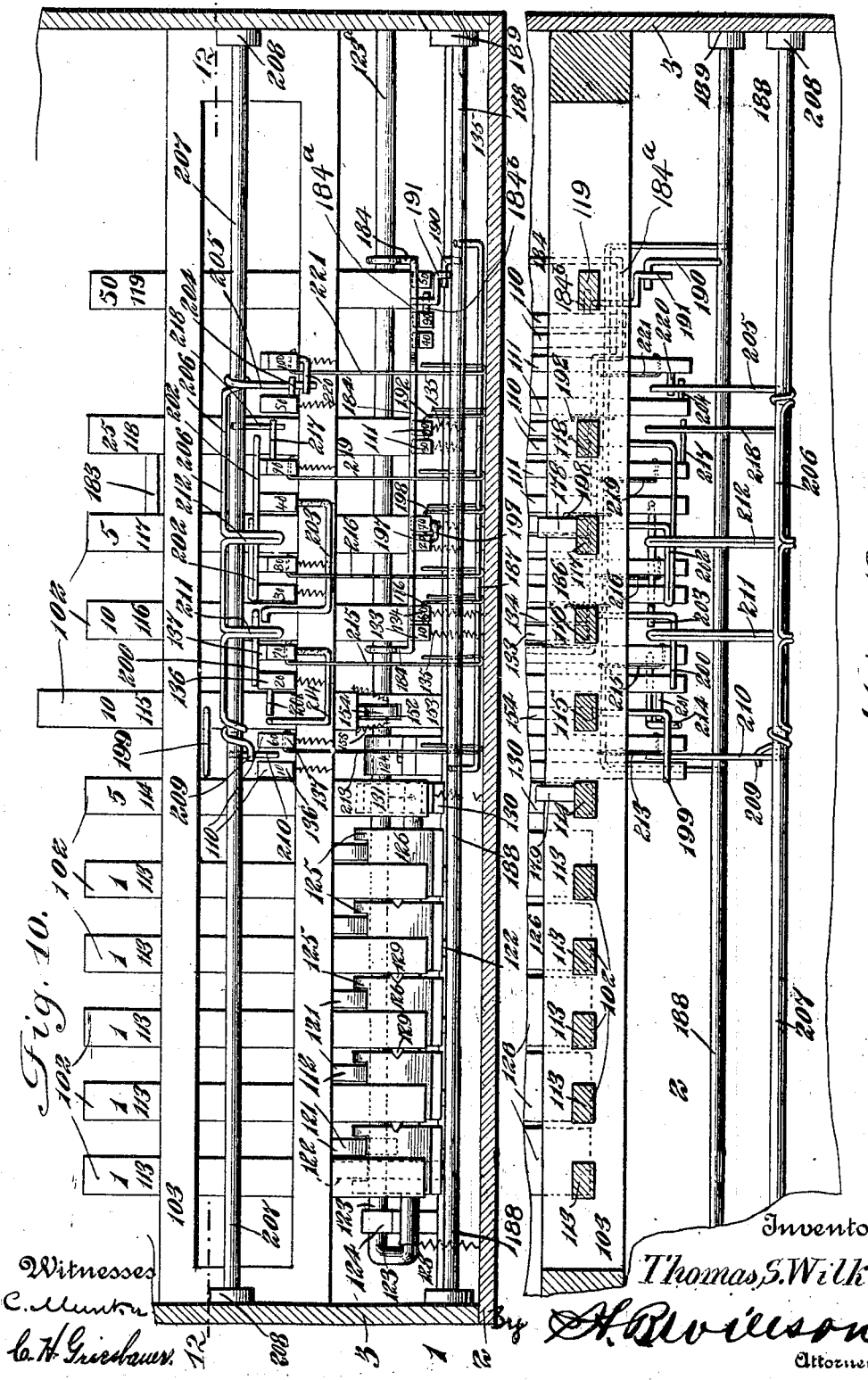

No. 812,160. PATENTED FEB. 6, 1906.
T. S. WILKES.
CHANGE MAKING MACHINE.
APPLICATION FILED DEC. 22, 1904.
10 SHEETS—SHEET 9.
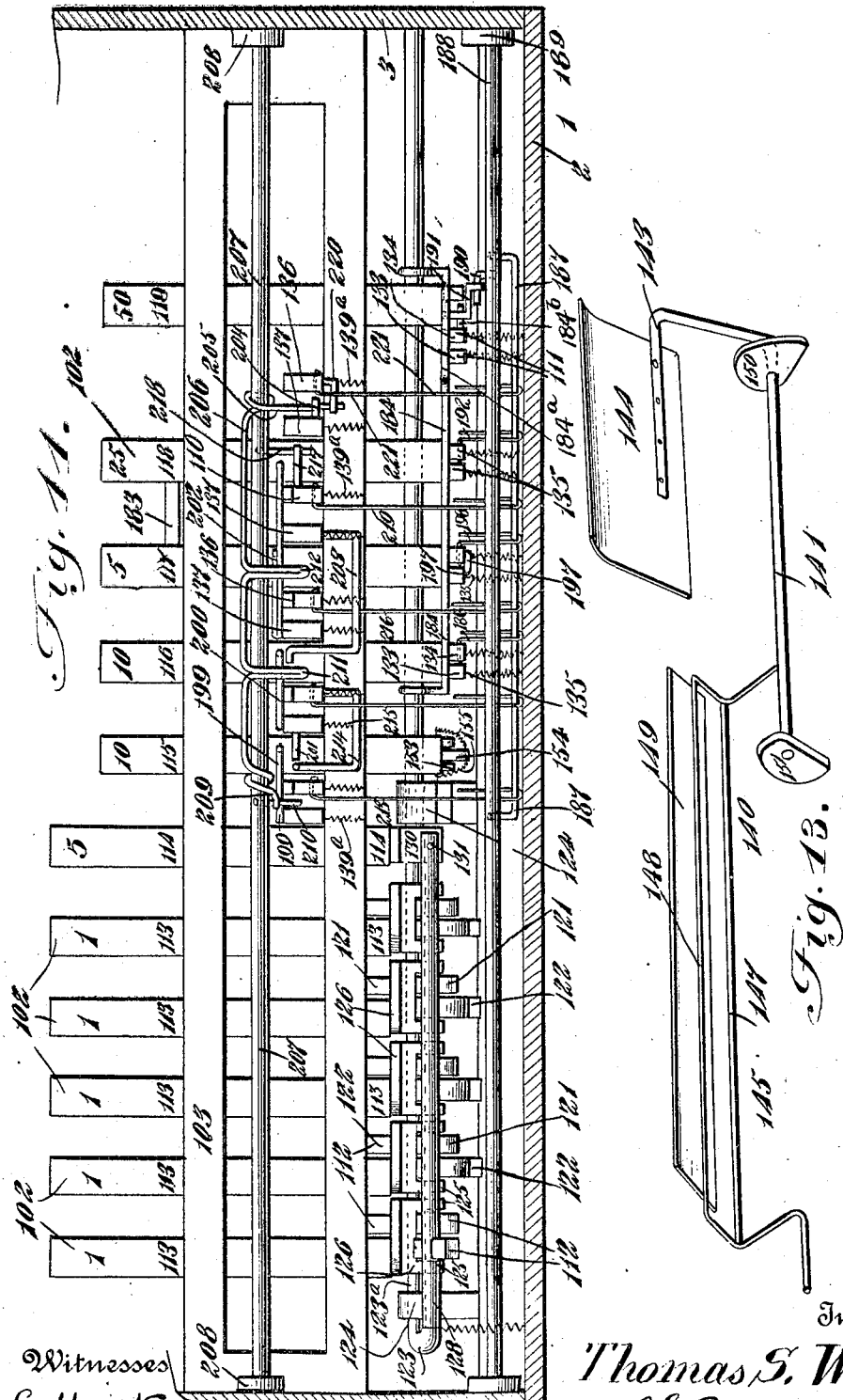
Witnesses
C. Munk
C. H. Giersbauer
Inventor
Thomas S. Wilkes
H. B. Wilson
Attorney

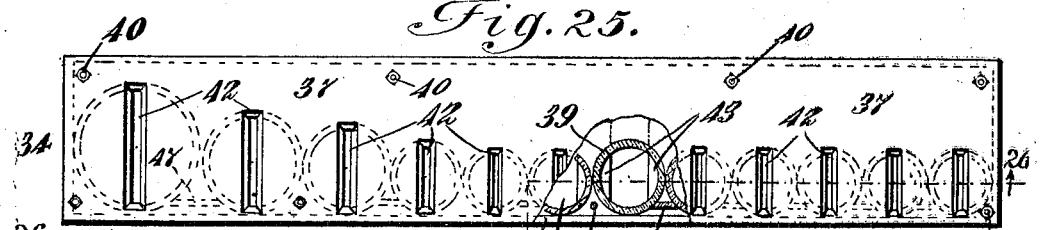
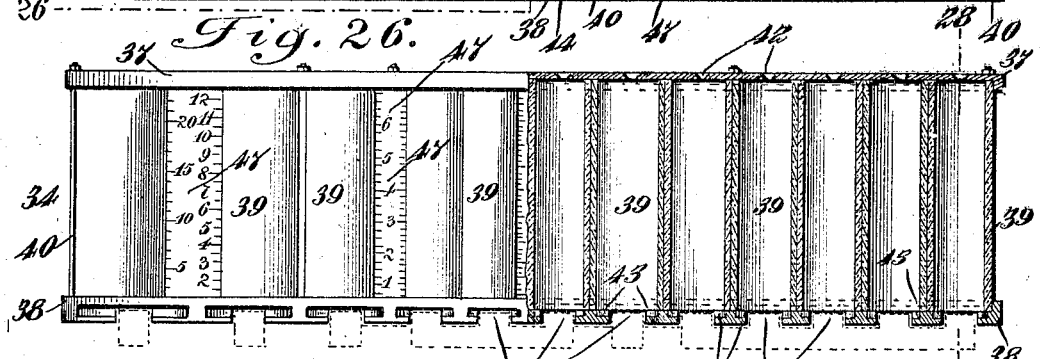
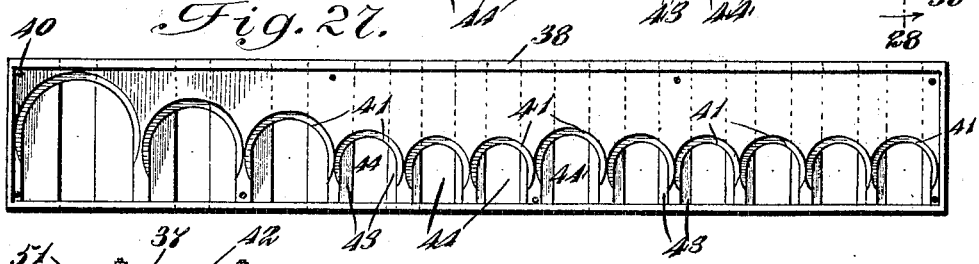
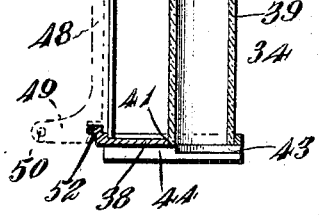
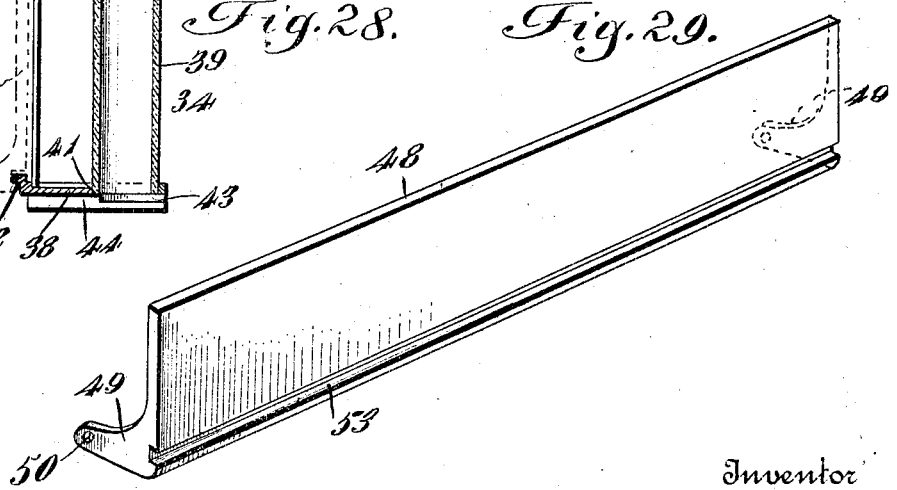

UNITED STATES PATENT OFFICE.

THOMAS S. WILKES, OF PHŒNIX, ARIZONA TERRITORY, ASSIGNOR TO THE AMERICAN PATENT PROMOTION COMPANY, OF PHŒNIX, ARIZONA TERRITORY, A CORPORATION OF ARIZONA TERRITORY.

CHANGE-MAKING MACHINE.

No. 812,160.   Specification of Letters Patent.   Patented Feb. 6, 1906.

Application filed December 22, 1904. Serial No. 237,960.

*To all whom it may concern:*

Be it known that I, THOMAS SCOTT WILKES, a citizen of the United States, residing at Phœnix, in the county of Maricopa, Arizona Territory, have invented certain new and useful Improvements in Change-Making Machines; and I do declare the following to be a full, clear, and exact description of the invention, such as will enable others skilled in the art to which it appertains to make and use the same.

My invention relates to improvements in coin-handling apparatus, and more particularly to machines for making change.

One object of my invention is to provide a simple, durable, and efficient machine of this character which will deliver change equal in value to that of the coin deposited or the correct amount of change between the cost of an article or sale and the value of the coin tendered in payment thereof.

A further object of my invention is to provide a machine of this character having means whereby change for coins of a superior value or denomination may be made without the use of certain coins of inferior value or denomination unless they are especially desired or required.

With the above and other objects in view the invention consists in certain novel features of construction, combination, and arrangement of parts hereinafter fully described and claimed, and illustrated in the accompanying drawings, in which—

Figure 1:
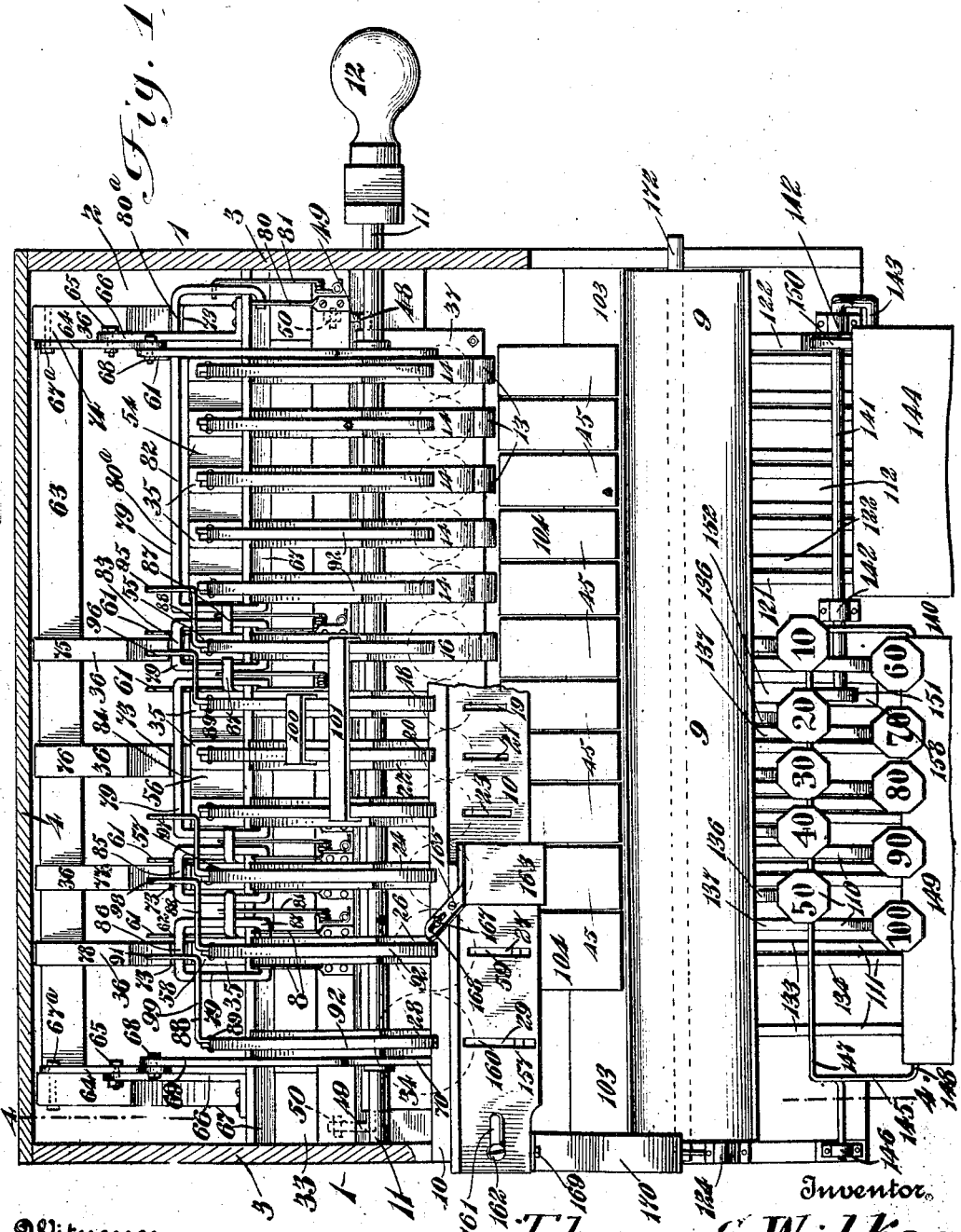
Figure 3:
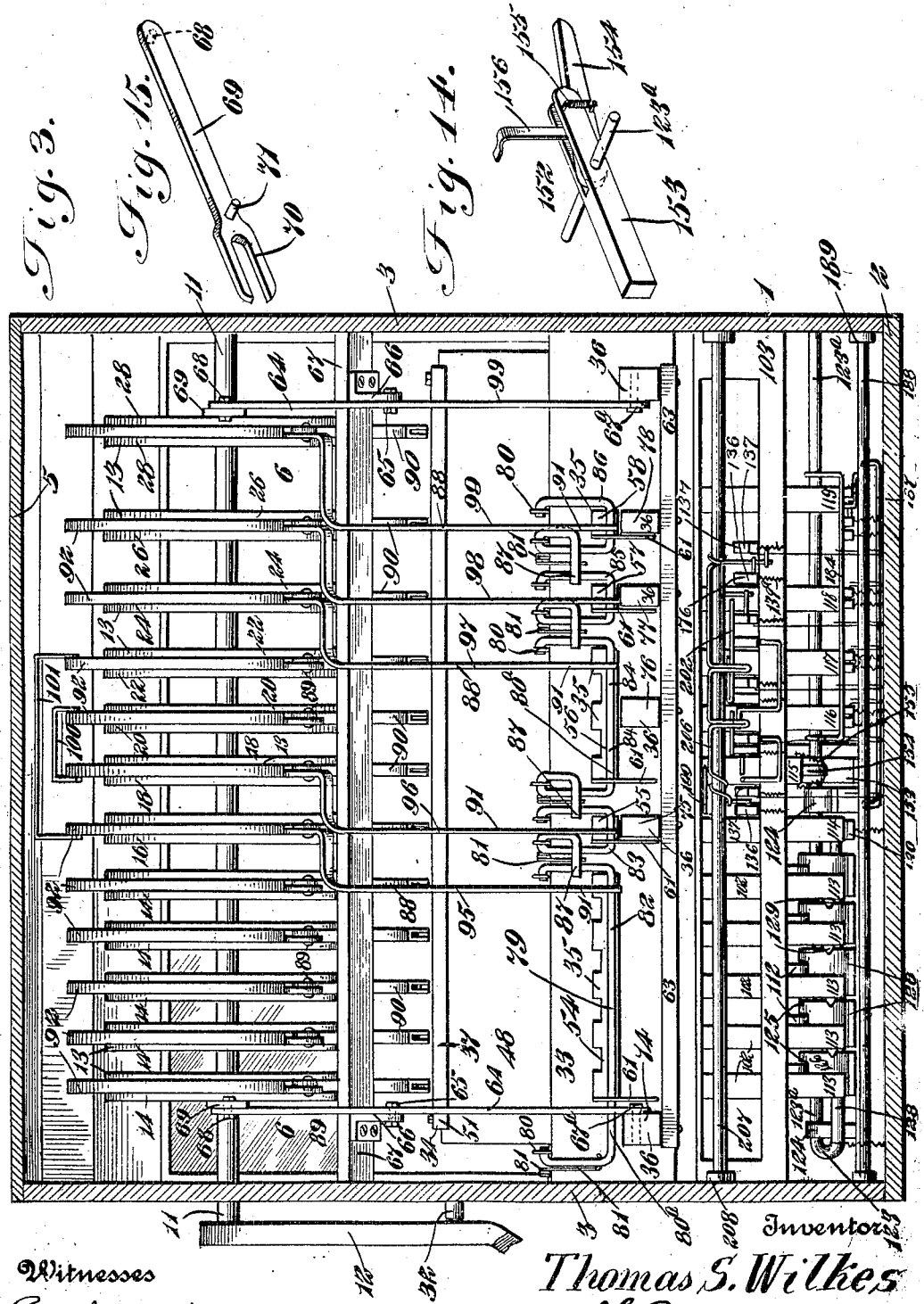
Figure 4:
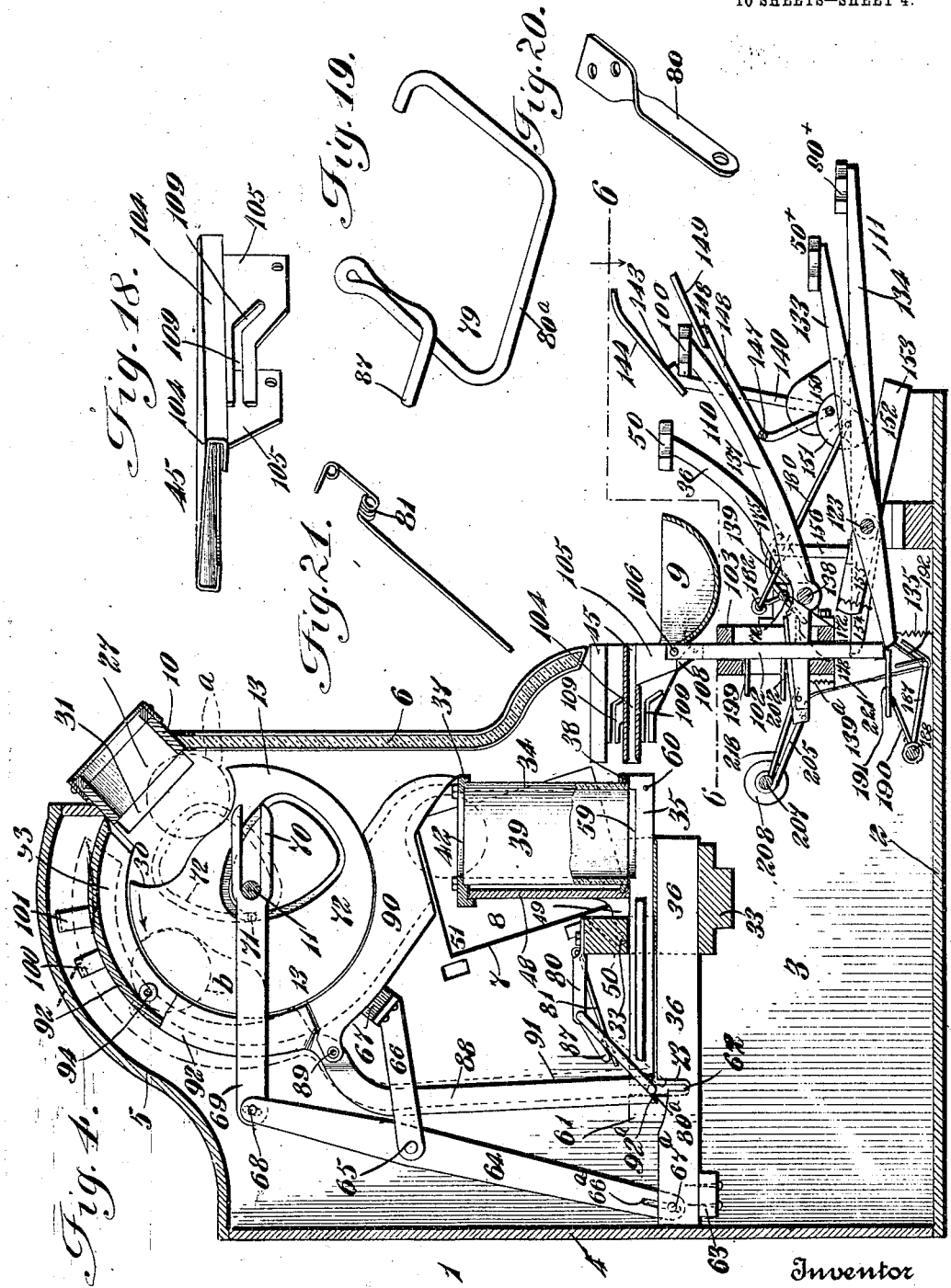
Figure 5:
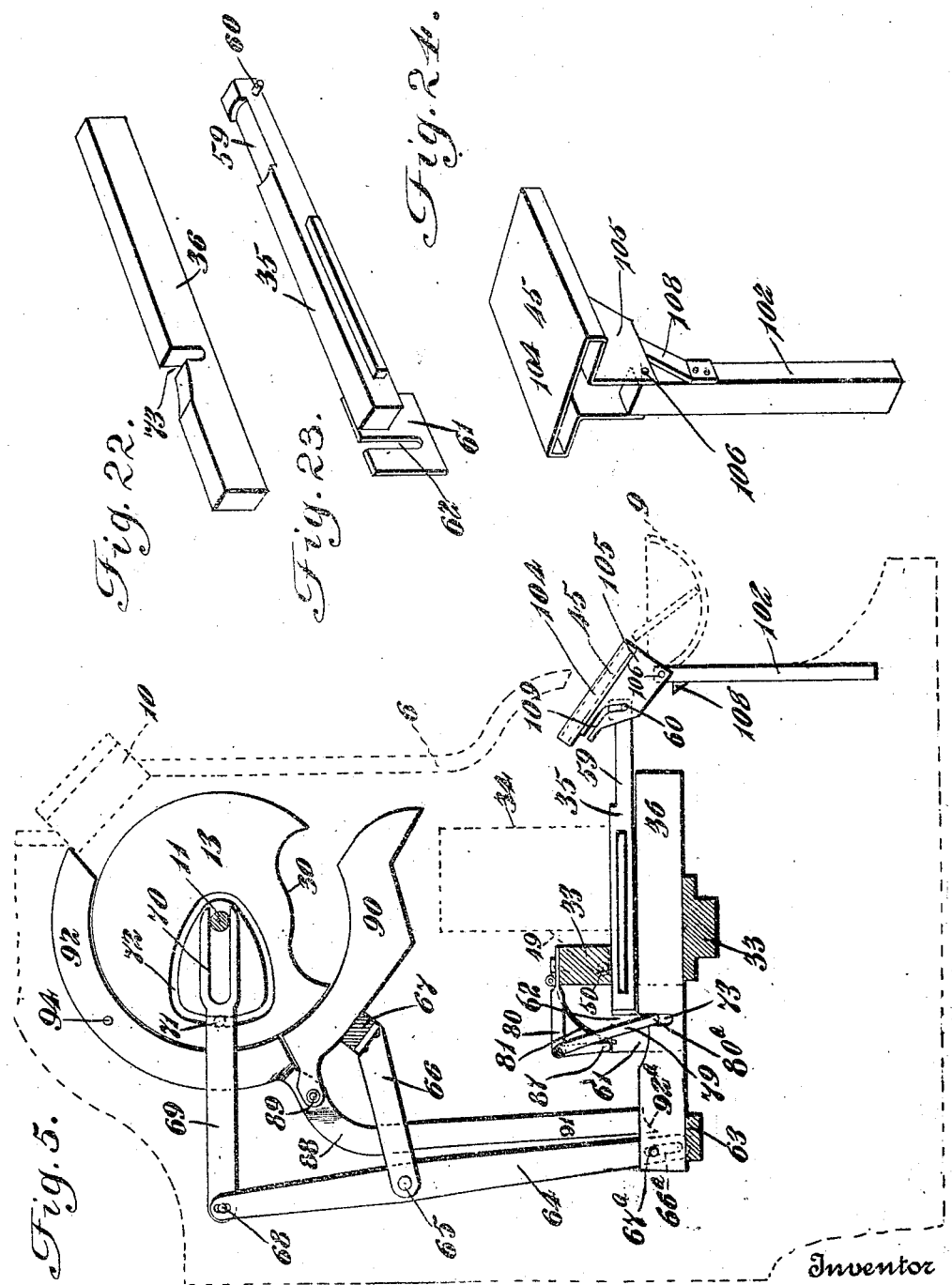
Figure 6:
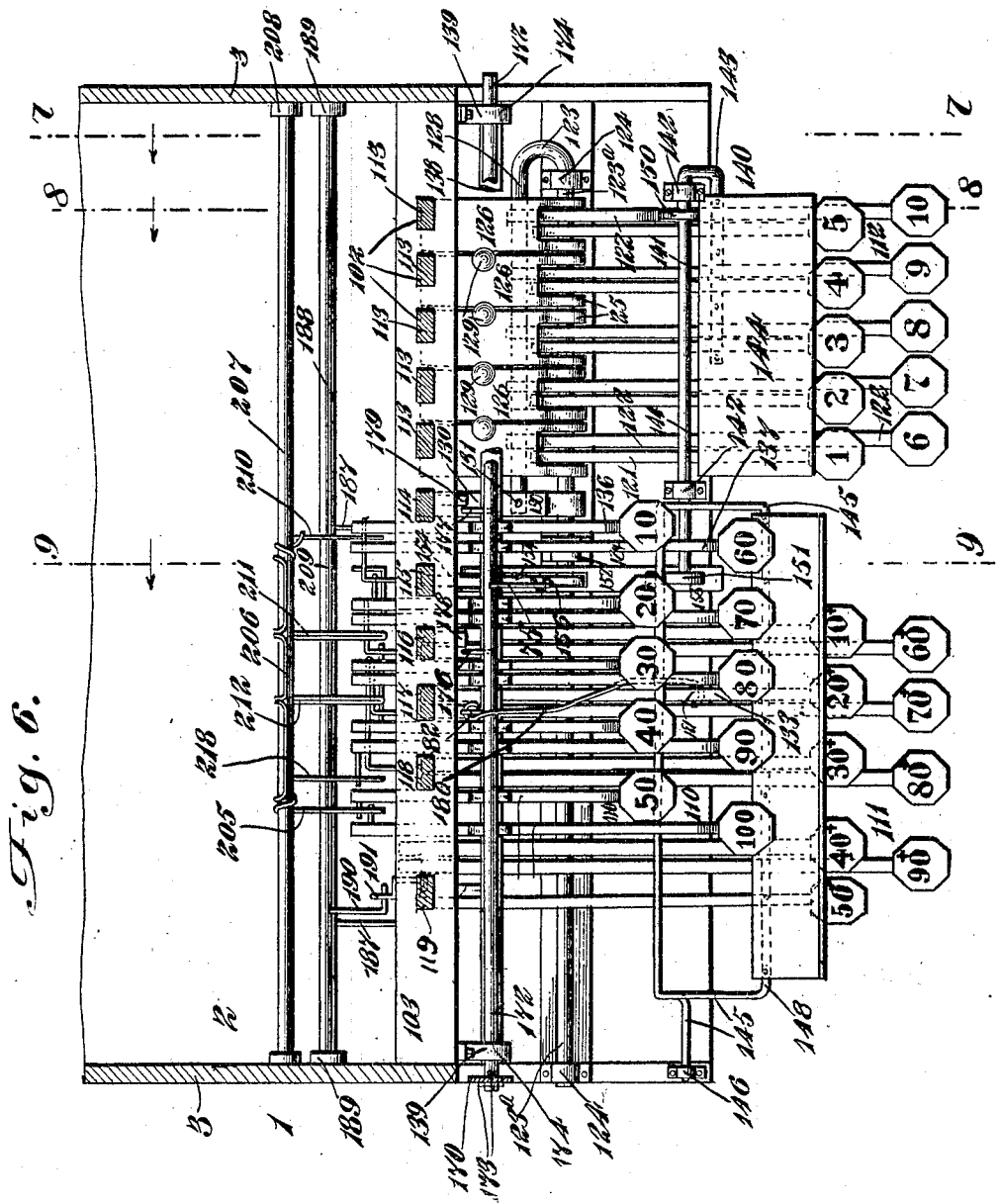

Figure 1 is a top plan view of a machine embodying my invention, a portion of the keyboard being omitted and the top and front of the casing being removed to more clearly illustrate the operative parts of the machine. Fig. 2 is a front elevation of the same, the front of the casing and the keyboard being removed. Fig. 3 is a rear elevation of the machine with the rear wall of its casing removed. Fig. 4 is a vertical front-to-rear sectional view taken substantially in the plane indicated by the line 4 4 of Fig. 1, the plane of the section being irregular to more clearly illustrate the coin-holder and the coin-delivery mechanism. Fig. 5 is a detail sectional view similar to Fig. 4, showing the coin-delivery mechanism moved from its normal position, as seen in Fig. 4, to the position it assumes when a coin is discharged from the machine. Fig. 6 is a detail horizontal sectional view taken on the plane indicated by the line 6 6 of Fig. 4. Fig. 7 is a detail vertical sectional view taken on the plane indicated by the line 7 7 of Fig. 6. Fig. 8 is a similar view taken on the plane indicated by the line 8 8 of Fig. 6 and showing the keyboard-cut-off device in its elevated position in full lines and in its lowered position in dotted lines. Fig. 9 is a similar view taken on the plane indicated by line 9 9 of Fig. 6 and showing in full and dotted lines the two positions of the double lever for operating the first ten-cents or dime deliverer controller or check. Fig. 10 is a rear elevation, on an enlarged scale, of the keyboard, coin-deliverer controllers or checks, and the operative connections between the same, the first dime-deliverer controller being in its elevated position and the first nickel and the five one-cent-deliverer controllers or checks being in their lowered positions. Fig. 11 is a view similar to Fig. 10, said dime, nickel, and five one-cent deliverer controllers being in their reverse positions. Fig. 12 is a detail horizontal sectional view of the parts shown in Fig. 10, the plane of the section being indicated by the line 12 12 of Fig. 10. Fig. 13 is a detail perspective view of the cut-off device which controls the use of the several groups of keys of the keyboard and which operates the first dime, the first nickel, and the five one-cent deliverer controllers. Fig. 14 is a detail perspective view of the double lever for operating the first dime or ten-cent deliverer controller or check. Fig. 15 is a perspective view of one of the forked bars or links by means of which the motion of the cams upon the main shaft is imparted to the levers which operate the sliding feeder-operators. Fig. 16 is a perspective view of one of the "cent-keys." Fig. 17 is a perspective view of one of the pivoted plates for imparting the motion of the cent-keys to the one-cent-deliverer controllers or checks. Fig. 18 is a perspective view of one of the coin-deliverers. Fig. 19 is a perspective view of one of the connectors for locking the coin-feeders to the feeder-operators. Fig. 20 is a perspective view of one of the brackets in which said connectors are pivotally mounted. Fig. 21 is a detail view of one of the springs for retracting said connectors. Fig. 22 is a perspective view of one of the coin-feeder operators. Fig. 23 is a similar view of one of the coin-feeders. Fig. 24 is a perspective view of one of the coin-deliverers mounted upon its controller or check. Fig. 25 is a top plan view of a coin-holder, its plate being partially broken away. Fig. 26 is a front elevation of the same with parts in section, the plane of the section being indicated by the line 26 26 of Fig. 25. Fig. 27 is a plan view of the upper face of the bottom plate of the coin-holder. Fig. 28 is a vertical transverse sectional view through the coin-holder, its swinging supporting-bracket being shown in dotted lines; and Fig. 29 is a detail perspective view of said bracket for supporting said coin-holder.

The embodiment of my invention which I will presently describe is in the form of a machine adapted for changing United States coins from the one-dollar denomination down; but it will be understood that the principle may be extended for coins of any denomination in the United States money system, or any other foreign money system. Of course the number of mechanical parts and also the mechanical construction would have to be extended and varied somewhat; but the same may be done without departing from the principle of and within the scope of my invention. It will also be understood that my invention may be used in connection with cash-registers and similar machines and, if desired, mechanism may be applied to the machine hereinafter set forth for registering the amount deducted from the coins deposited in the machine.

Referring to the drawings by characters, 1 denotes a suitable frame or casing comprising a base or bottom 2, side or end walls 3, a back or rear wall 4, top 5, and a front wall 6, which is preferably constructed of glass or other transparent material to permit the coin-holders and operative parts of the machine to be seen from the outside. One of the end walls 3 is formed with an opening 7, closed by a suitable door 8 (shown in Fig. 4) and provided for inserting and removing the coin-holder, hereinafter described. A keyboard for operating and controlling the different parts of the mechanism mounted within the casing is provided at the front of the machine and extends forwardly beneath the partial glass front 6. Directly above said keyboard and below the bottom of the glass front 6 is a transversely-disposed trough 9, adapted to receive the coins discharged from the machine, and directly above the said front 6 is an inclined bar or plate 10, in which slots are formed to receive coins of different denominations.

Mounted upon suitable bearings in the upper portions of the end walls 3 of the casing is a horizontal shaft 11, which has on one of its outer ends a crank-handle 12, by means of which the machine is operated. Secured upon said shaft at suitable intervals and in alinement with said slots in the bar 10 is a series of coin-receiving disks 13. As shown, I have provided twelve of said disks. The first five disks, which are denoted by the numeral 14, are adapted to receive one-cent coins deposited through slots 15 (see Fig. 2) formed in the bar 10, the next disk 16 being adapted to receive a nickel or a five-cent coin deposited through the slots 17 formed in said bar, the next disk 18 being adapted to receive a dime or ten-cent coin deposited in the slot 19, formed in said bar, the next disk 20 being adapted to receive a dime or ten-cent coin deposited in the slot 21 formed in said bar, the next disk 22 being adapted to receive a nickel or five-cent coin deposited in the slot 23 formed in said bar, the next disk 24 being adapted to receive a quarter or twenty-five-cent piece deposited in the slot 25 formed in said bar, the next disk 26 being adapted to receive a half-dollar or fifty-cent coin deposited in slot 27 formed in said bar, and the last disk 28 being adapted to receive a silver dollar deposited in the slot 29 formed in said bar. Each of said disks 13 has formed in its periphery a coin pocket or recess 30 (see Figs. 4 and 5) of a size corresponding to the coin which the disk is adapted to receive. Coacting with said pockets 30 are parallel guide-plates 31, which are provided upon the under side of the bar 10 adjacent to each of its slots. Said guide-plate 31 (indicated in Figs. 2 and 4) and pockets 30 are so disposed that the coin of the size designed to be inserted through the slot with which they coact will be retained therein, and should a coin of smaller size be inserted it will roll out of said pocket. Said disks 13 are so arranged upon the shaft 11 that when the crank-handle is engaged with the friction-stop 32, (shown in Fig. 2,) which may be of any suitable form, located upon the casing, their pockets 30 will be disposed below the slots in the bar 10.

Within the casing 1 below the shaft 11 is a cross-beam or support 33, upon which are mounted a plurality of coin-holders 34, a plurality of coin-feeders 35, and a plurality of coin-feeder operators 36 are shown in detail in Figs. 25 to 29. Said coin-holders 34 comprise a top plate 37, bottom plate 38, a plurality of coin-tubes 39, of glass or other transparent material, and a series of clamping-bolts or suitable fastening means 40. Said coin-tubes 39 are seated in recessed portions 41 in the top and bottom plates and are secured therebetween by the bolts 40. One of said tubes is provided for each of the coin-receiving disks 13—that is, I provide five one-cent tubes, two five-cent tubes, two ten-cent tubes, one twenty-five-cent tube, one fifty-cent tube, and one one-dollar tube. In the top plate 37, directly above each of the coin-tubes, is a coin-receiving slot 42, and in the bottom plate 38, directly below each of said tubes, is a coin-deliverer slot 43, which opens upon the front edge of said plate 38. Upon the under side of the said plate 38 in alinement with said slot 43 are transversely-extending grooves 44, in which the coin-feeders 35 are adapted to slide in order to feed the coin from said tubes to suitable coin-deliverers 45, mounted at the front of the machine above and in rear of the coin-receiving trough 9.

In order to indicate the number or value of the coins within each of the tubes, I provide suitable scales which may be etched or otherwise formed on the glass coin-tubes 39, as shown at 46 in Fig. 2 of the drawings, or marked on suitable plates 47, arranged between pairs of said coin-tubes, as shown in Figs. 25 and 26 of the drawings. The coin-holder is preferably removably mounted in the casing in order that it may be removed from the machine when the same is not in use and placed in a safe or the like. This mounting may be effected in any desired manner; but I preferably provide a swinging bracket 48 in the form of a rectangular plate, having on its rear face at its lower corners rearwardly-projecting lugs or arms 49, which are pivoted, as shown at 50, in the upper portion of the cross-beam 33, so that said bracket may be tilted vertically. The coin-holder is slidably engaged with said bracket by forming upon the rear edge of the top plate 37 a downwardly-projecting flange 51, which is adapted to engage the upper edge of the bracket-plate, and by forming the rear edge of the bottom plate 38 with a rib or flange 52, adapted to engage a longitudinally-disposed groove 53, formed in the front face of the bracket 48, adjacent to its lower edge. It will be seen that when it is desired to remove the coin-holder the bracket 48 is tilted rearwardly to disengage the holder from the coin-feeders 35 and then slid laterally through the opening 7, formed in one of the end walls 3 of the casing.

The coin-feeders 35 (one of which is shown in detail in Fig. 23) are in the form of rectangular blocks of less width than the diameter of the coins. They are mounted to reciprocate below the coin-tubes in suitable openings formed in the cross-beam 33. One of said coin-feeders is provided for each of the coin-tubes, but the five one-cent feeders are integral and form a single slide 54, as shown in Figs. 1 and 3 of the drawings. The first dime, the second dime, and the second nickel feeders are also made integral to form a single slide 56, but the first five-cent or nickel feeder, the twenty-five-cent or quarter-of-a-dollar feeder, and the fifty-cent or half-dollar feeder are separate and form slides 55, 57, 58, respectively, the one-dollar feeder being omitted, since the capacity of the machine is limited. Upon the upper side of each of the coin-feeders 35 is a coin-receiving recess 59, and adjacent to the front end upon one side of each of said feeders is a laterally-projecting pin 60, which is adapted to operate the coin-deliverers 105, as hereinafter explained. At the rear end of each of the slides or groups of feeders 54, 55, 56, 57, and 58 are secured plates 61, in which vertically-disposed slots 62 are formed in order to permit the same to be locked to their respective operators 36. Said coin-feeder operators 36 are also in the form of rectangular bars, which are mounted to slide below the feeders 35 in suitable openings formed in the cross-beam 33. One of said operators 36 is provided for each slide or group of feeders 54, 55, 56, 57, and 58, and they are all connected by a cross-bar 63, secured upon their under sides at their rear ends. (See Figs. 3, 4, and 5.) Said slides are adapted to be freely reciprocated by means of one or more levers 64, pivoted intermediate their ends, as shown at 65, upon brackets 66, secured to a cross-bar 67, connecting the ends 3 of the casing. As shown in the drawings, Fig. 3, two of said levers 64 are provided and have their lower ends provided with slots 66ª, which loosely engage studs 67ª, provided upon the two end feeder-operator slides 36. The upper ends of said levers 64 are similarly connected, as shown at 68, to the rear ends of links or bars 69, which have their forward ends forked or bifurcated, as shown at 70, to loosely engage the shaft 11. Upon one face of each of said links 69 is a stud or pin 71, which is adapted to travel in a cam-groove 72, formed in one of the coin-receiving disks 13 or in a suitable disk secured upon said shaft. It will be seen that by means of this construction when the shaft 11 is rotated the links 69 and levers 64 will be operated to reciprocate the feeder-operators 36 simultaneously. In order to permit the feeder-slides to be locked to their respective operators, the latter are formed with vertically-disposed slots or recesses 73, which are so disposed that when the feeders and feeder-operators are in their normal position, as shown in Fig. 4 of the drawings, said slots 62 and 73 will be substantially in alinement with each other.

In order to lock the slides 54, 55, 56, 57, and 58 to their respective operators 74, 75, 76, 77, and 78, I provide a series of connectors 79, which are mounted to swing in brackets 80, secured upon the upper side of the cross-beam 33. One of said connectors is shown in detail in Fig. 19. Said connectors vary in size, according to the width of the slides which they operate, and each is formed with a portion 80ª, adapted to lie normally in the upper portion of the slot 62 in one of the plates 61 and to be forced downwardly into the slot 73, as hereinafter described, in order to lock one of the coin-feeders to its operator. A spring or other suitable retracting means 81 is also provided for each of the connectors in order to hold them in their normal position, as seen in Figs. 3 and 4 of the drawings. The connector 83 for the first five-cent or nickel feeder is provided with a stop 87, which is adapted to engage the connector 82 for the five one-cent feeders in order to operate the latter when the former is operated. Each of the remaining connectors 84, 85, and 86 for the slides 56, 57, and 58, respectively, are also provided with similar stops 87, so that when any one of said connectors is operated it will cause all of the connectors below it to be simultaneously operated, as will be readily seen upon reference to Fig. 3 of the drawings.

In order to operate the connectors 79, I provide a series of levers 88, which are pivoted intermediate their ends, as shown at 89, upon the rear ends of coin-conductors 90, which are mounted upon the cross-bar 67 below the coin-disks 13. One of said levers is shown in detail in Fig. 5. Each of said levers 88 has its offset lower end 91 recessed, as shown at 92$^a$, to engage one of the connectors 79. The upper ends 92 of each of said levers 88 is in the form of a channel or trough arc-shaped bar, the curvature of which corresponds to that of coin-disks 13. The channel or trough 93, formed on each of the ends 92 of the levers, coact with the coin-pockets 30 in said coin-disks 13, and guides the coin from the slotted bar 10 to the coin-conductors 90, which latter direct it to the coin-holder 34. The depth of the pocket 30 varies according to the diameter of the coin it is to receive, so that when the proper coin is placed therein it projects beyond the periphery of the disk, as shown in dotted lines at $a$ in Fig. 4. When the lever 88 is in its normal position, as shown at Fig. 4 of the drawings, its channel end 92 is so disposed that the combined depth of the pocket 30 and the channel 93 equals the diameter of the coin $a$. In order that the coin may operate the lever 88, a trip 94, preferably in the form of a roller, is provided at a suitable point in the channel 93, and is adapted to be engaged and operated by a coin, as indicated in dotted lines in Fig. 4 of the drawings. It will be seen that when a coin in the disk 13 is moved to the dotted-line position shown at $b$ in Fig. 4 the upper end 92 of the lever 88 will be moved rearwardly while its lower end 91 will be moved forwardly and downwardly to swing the connector 79 into the slot 73. After the coin has passed under the roller 74 the lever will swing by gravity to its normal position, and the coin will be directed by the conductor 90 to its proper tube in the holder 34.

One of the levers 88 is provided for each of the connectors 79. The lever 95, which operates the connector 82, has its trough or channeled upper end coacting with the first nickel or five-cent coin-receiving disk 16. The lever 96, which operates the connector 83, has its upper end coacting with the first dime or ten-cent disk 19. The lever 97, which operates the connector 84, has its upper end coacting with the twenty-five-cent or quarter-of-a-dollar coin-disk 24. The lever 98, which operates the connector 85, has its upper end coacting with the fifty-cent coin-disk 26. The lever 99, which operates the connector 86, has its upper end coacting with the one-dollar coin-disk 28. Those coin-disks which have no lever 88 coacting with them have channeled arc-shaped bars, which correspond to the upper ends of the said levers, so that the coins deposited in the pockets of said disks will be directed to the conductors 90 and fed to their respective coin-tubes in the coin-holders. The two channeled bars or levers of the first and second ten-cent or dime coin-disks are rigidly connected by an arched brace 100, so that when the coin is deposited in either of the ten-cent slots the connector 83 will be operated, and the two channeled bars or levers of the first and second five-cent or nickel coin-disks are similarly connected by an arch 101, so that when a nickel is deposited in either of the nickel-slots the connector 82 will be operated. By thus connecting said parts either of the five-cent or ten-cent coin-tubes in the holder may be filled when necessary, the contents of each of the two tubes being visible through the glass front 6 of the casing. One of the conductors 90 is provided for each of the coin-disks 13, and each conductor has its lower open end in alinement with the proper coin-receiving slot 42, formed in the top plate of the coin-holder.

The coin-feeders 35, when operated move the coin into tilting deliverers 45, which are mounted upon the upper ends of controllers or checks 102, one of which is shown in detail in Fig. 24. Said controllers are in the form of rectangular blocks, which are mounted to slide vertically in suitable openings formed in a cross bar or beam 103, disposed at the front of the machine. Each of the coin-deliverers 45 comprises a flattened tubular portion 104, open at each end and upon its bottom and formed with depending portions or arms 105. The opening in the bottom of said channeled portion 104 of each deliverer is of slightly greater width than that of the feeders 35, which when operated move into said opening. When said deliverers are in their normal position, as shown in Fig. 4 of the drawings, the tubular portions 104 are in the same plane as the coin-recesses 59 in the feeders 35, so that when the latter are moved forwardly the coins in said recess 59 will enter the tubular portion 104, and its sides will project over the bottom of the same. Said deliverers are pivotally mounted upon the upper ends of the controllers 102 by means of studs 106, provided upon opposite sides of the latter and adapted to project into openings 107, formed in the lower portion of the depending arms 105 of the deliverers. Suitable stops 108 are provided upon each of the controllers 102 and are engaged by one of the arms 105 to limit the inward swinging movement of the deliverers and to hold them in their normal position. In order to tilt the deliverers, I form in one or both of the arms 105 a cam-slot 109, in which the pin 60 upon one of the deliverers 35 is adapted to travel. It will be seen that when the slide 35 is moved forwardly the pin 60 will engage the upper wall of said cam-slot and tilt the deliverer, as shown in Fig. 5 of the drawings, and when moved rearwardly will engage the lower edge of said cam-slot and return the deliverer to its normal position.

In order to prevent the operation of certain of the deliverers when it is desired to deduct the amount of a purchase from the value of the coin deposited in the machine, I provide key-levers and connections for elevating the controllers 102, and hence their deliverers 45, to an inoperative position—that is, I move them out of the path of the coin-feeders 35. As clearly shown in Figs. 6 to 12 of the drawings, I provide an upper single group of keys 110 and a lower double group consisting of two separate groups 111 and 112. The keys of the single group 110 are used for separately deducting a series of equal values, which in the present embodiment of my invention is ten, and the keys of the double group or the two lower groups 111 and 112 are used for deducting intermediate values. In other words, the group 110 is used when it is desired to deduct ten, twenty, thirty, forty, fifty, sixty, seventy, eighty, ninety, or one hundred from the coin deposited, and the groups 111 and 112 are used when it is desired to deduct any intermediate or lower values. The lower groups 111 and 112 are also used in making even change when it is desired to obtain a plurality of coins of inferior value in place of a single coin of superior value—for instance, when it is desired to obtain a nickel and five pennies instead of a dime. The group 112 operates the five one-cent deliverer-controllers or checks 113 and the first five-cent or nickel deliverer controller 114, while the other two groups 110 and 111 operate the first dime or ten-cent deliverer controller 115, the second dime-deliverer controller 116, the second nickel-deliverer controller 117, the quarter-deliverer controller 118, and the half-dollar-deliverer controller 119, the one-dollar-deliverer controller and those of higher denominations being omitted in machines limited as the present one is to the changing of coins of one dollar and lower denominations.

The group 112 consists of ten key-levers, arranged in upper and lower rows of five each. The upper row of key-levers 121 are numbered 1 2 3 4 5 from left to right, and the lower row 122 of key-levers are numbered 6 7 8 9 10, the numerals denoting "cents." These levers are arranged in pairs, as clearly seen in Fig. 6, and are pivoted upon one arm 123ª of a U-shaped rod or shaft 123, which is mounted to rock or swing in suitably-mounted bearings 124. Each of these pairs, which consist of one lever of each row, are disposed between apertured ears 125 of swinging plates 126, Figs. 6, 8, and 17, which are pivoted upon the portion 123ª of the rock-shaft 123 by the passage of said portion 123ª through said apertured ears 125. Each of the key-levers 121 has its rear end shaped, as shown at 127, Fig. 16, to engage and lift one of the plates 126, and each of the levers 122 has its rear end shaped to engage and lift one of said plates 126 and also the other arm or end 128 of the rock-shaft 123. Each of the plates 126 has its rear end disposed below one of the deliverer-controllers 113 in order to lift the latter when operated, and upon the first four of said plates are provided stops 129, which overhang the next adjacent plate, as shown in Fig. 6 of the drawings. By this construction it will be seen that when key numbered 1 is depressed the first plate 126, and hence the first deliverer-controller 113, will be elevated to move its coin-deliverer to an inoperative position. When the key numbered 2 is depressed the first two plates 126 and the first two controllers 113 will be operated, and so on up to key numbered 5. The extreme end of the arm 128 is connected, as shown at 131, to a swinging plate 130, Fig. 6, which is pivoted upon the arm 123ª of said shaft and has its rear end disposed below the first five-cent or nickel deliverer controller 114, which it is adapted to elevate, Figs. 10 and 12. By means of this construction when one of the lower key-levers 122 is depressed the plate 130 will be raised to lift the controller 114 and one or more of the plates 126 and will also be raised according to the key depressed. Springs or other suitable means 132 may be provided for returning the keys to their normal position after being depressed, and, if desired, stops may be provided upon the controllers 102 to limit their movement.

The group of keys 111, which is used in conjunction with the group 112, consists of ten key-levers arranged in upper and lower rows of five each, the upper row 133 being numbered from right to left 10+, 20+, 30+, 40+, and 50+, and the lower row 134 being numbered 60+ 70+ 80+ 90+. Each of these levers 133 and 134 is pivoted upon the long arm 123ª of the rock-shaft 123, and the rear ends of each pair of said levers are disposed below the proper deliverer-controllers 102, the 10+ and 60+ keys coacting with the second ten-cent or dime controller 116, the 20+ and 70+ keys coacting with the second five-cent or nickel controller 117, the 30+ and 80+ keys coacting with the twenty-five cent or quarter controller 118, the 40+ and 90+ keys coacting with certain connections hereinafter described, and the 50+ key coacting with the fifty-cent or half-dollar controller 119. (See Fig. 6.) Suitable springs 135 are provided for returning said keys 133 and 134 to their normal positions. The connections between these key-levers and the deliverer-controllers 102, whereby the proper number of the latter are moved to an inoperative position when the keys are depressed, will be presently explained.

The group of keys 110 is similar to the group 111 and consists of ten key-levers arranged in pairs and in two rows of five each, the upper row 136 being numbered from right to left 10, 20, 30, 40, 50 and the lower row 137 being numbered 60, 70, 80, 90, 100. These keys are all pivoted upon a shaft 138, extending across the front of the machine and mounted in bearings 139, secured upon the bar or beam 103. Each pair of said levers has its rear ends projecting between two of the deliverer-controllers 102 and are provided with connections, hereinafter described, for operating the proper number of said controllers. Suitable springs 139$^a$ are provided for restoring these key-levers to their normal positions.

In order to prevent the use of both the upper group of keys 110 and the two lower groups 111 and 112 at the same time, I provide a cut-off device 140, which comprises a rock-shaft 141, disposed above the group of keys 112 and journaled in suitable bearings 142. Said shaft is provided at one end with an arm 143, carrying a guard or cover plate 144 to coact with said group 112, and to its other end is secured one end of a frame 145, which has its opposite end journaled in a suitable bearing 146, located at one side of the machine. Said frame 145 comprises a bar 147, which coacts with the group of keys 110, as seen in Fig. 4 of the drawings, to prevent the operation of the same and a similar bar 148, to which is a cover or guard-plate 149 to coact with the group of keys 111. When this cut-off device 140 is in its raised position, as shown in Figs. 4 and 6 of the drawings, the group of keys 110 will be prevented from being used by the bar 147, and when the same is in its lowered position, as indicated by the dotted lines in Figs. 8 and 9 of the drawings, the guard-plates 144 and 149 will cover two groups of keys 112 and 111 to prevent the same from being used.

The cut-off device 140, which is shown in detail in Fig. 13, also controls the operation of the first dime-deliverer controller 115 and the first nickel and the five one-cent-deliverer controllers 114 and 113—that is to say, it is adapted to control the substitution of the one for the other. This is effected by providing upon the shaft 141 two cams or eccentrics 150 and 151, the former coacting with the ten-cent-key lever 122 and the latter with a double lever 152, which operates the first ten-cent or dime deliverer controller. Said lever 152 comprises two parts 153 and 154. The part 153 has its rear end bifurcated and pivoted upon the end 123$^a$ of the rock-shaft 123, and the forward end of said lever is solid and coacts with the cam 151. The part 154 of said double lever has its forward end pivoted upon the end 123$^a$ of said shaft between the bifurcated end of the part 153, and its forward end is disposed beneath the first ten-cent or dime deliverer controller 115. One or more coiled springs 155 connect said parts 153 and 154 to hold them in their normal position, as shown in Fig. 14, and at the same time permit one to swing independent of the other. Upon the upper side of the part 154 is an upwardly-projecting arm 156, the purpose of which will be presently explained. The cams 150 and 151 are so shaped and disposed upon the shaft 141 that when the cut-off 140 is in its elevated position, as shown in the drawings in full lines, the first ten-cent or dime deliverer controller 115 will be in its elevated position and the first nickel and five one-cent deliverer controllers 114 and 113 will be in their lowered position, as shown in Figs. 2, 9, and 10 of the drawings, and when said cut-off device is in its lowered position, as indicated by the dotted lines in Figs. 8 and 11 of the drawings, said controller 115 will be in its elevated position and the controllers 113 and 114 in their lowered position. Thus it is seen that the said cut-off device 140 is also adapted to substitute the dime-controller 115 for the nickel and five one-cent controllers 114 and 113, and vice versa, it being understood that when said controllers are in their elevated positions they render their deliverers inoperative. It will also be understood that when the cut-off device is in its elevated position the upper group of key-levers 110 is cut out of operation and the other two groups 111 and 112 will be cut into operation, the latter controlling the operation of the deliverer-controllers 114 and 113.

Since it is necessary to operate a different combination of deliverer-controllers in deducting twenty to twenty-five cents from a quarter of a dollar than that necessary to deduct twenty to thirty cents from a half of a dollar, I provide a safety shutter or slide upon the slotted bar 10 and suitable connections operated thereby for operating certain of the deliverer-controllers. This slide 157, which is clearly shown in Figs 1 and 2 of the drawings, is mounted on one end of said bar and is adapted to alternately open and close the twenty-five cent or quarter slot and those of a higher denomination. As shown, said slide consists of a rectangular plate formed with half-dollar and dollar coin-slots 159 and 160 and the longitudinally-disposed slot 161, through which a stud or pin 162 projects in order to guide said slide in its movement and retain it upon the bar 10. In order to operate said slide, I provide a swinging plate 163, formed with two guide-ears 164 and 165, which engage the edges or sides of the said slide and the bar 10. These ears are pivoted, as shown at 166, upon the slide, and the ear 165 is loosely pivoted to the bar 10 by a stud or pin 167, which passes through a slot 168, formed in said ear. By means of these pivots 166 and 167 it will be seen that when the plate 163 is swung upwardly, as shown in Fig. 2 of the drawings, the slide 157 will uncover the quarter-slot 25 and close the half-dollar and one-dollar slots 27 and 29 and when swung down to the position shown in Fig. 1 of the drawings will close said slot-25 and cause the slots 159 and 160 to register with the slots 27 and 29. The outer end of the slide 158 is pivotally connected, as at 169, to the upper end of a shifting lever 170, which is pivoted intermediate its ends at 171 upon the casing and has its lower apertured end loosely connected to a sliding rod 172 by two cross-pins 173. Said sliding rod extends across the front of the casing above the keyboard and is mounted in suitable bearings 174, secured upon the cross bar or beam 103. Upon said sliding bar 172 is a curved arm 175, which is adapted to coact with the said arm 156 of the lever 152 and to be moved into or out of engagement therewith when the slide 157 is shifted. Upon said sliding rod 172, as clearly shown in Figs. 2, 6, and 9 of the drawings, are two radially-projecting pins or arms 176 and 177, which are adapted to coact with lugs 178 and 179, respectively, which are secured upon the second ten-cent or dime deliverer controller 116 and the first five-cent or nickel deliverer controller 114. When said slide is in the position shown in Fig. 2 of the drawings, said pins 176 and 177 are disposed directly beneath the lugs 178 and 179, so that when the sliding bar 172 is rotated the controllers 116 and 114 will be elevated, and when said slide is in the position shown in Fig. 1 of the drawings said pins and lugs will be out of alinement with each other, as shown in Fig. 6 of the drawings, so that said controllers will not be operated when said rod is rotated. The sliding rod 172 is adapted to be rotated or rocked by the key-lever 133, which is marked 20+. This is effected by providing a link 180, connected at its lower end to said key-lever, as shown at 181, and at its upper end to an arm 182 upon said rod 172.

The operating connections for the key-levers of the group 111 will now be described. This group, it will be understood, is only used when the cut-off 140 is in its elevated position, and consequently the controller 115 is in its elevated position, as seen in Fig. 10 of the drawings. When the 10+ key is depressed, its rear end will elevate the second ten-cent or dime deliverer controller 116, thereby moving the same to an inoperative position, and prevent the delivery of ten cents, which would occur if the same was lowered. When the 20+ key is depressed and the slide 157 is in the position shown in Fig. 1, which position prevents a quarter from being deposited, the link 180 will rock the rod 172 and cause its curved arm 175 to force the arm 156 downwardly, and thereby depress the part 154 of the lever 152 to permit the first ten-cent or dime deliverer controller 115 to lower to its operative position, and the rear end of said key-lever will elevate the second nickel and the quarter deliverer controllers 117 and 118, the two being connected by a cross-bar 183 and the rear end of said key-lever engaging the lower end of the controller 117. When this key-lever 20+ is depressed and the slide 158 is in its position shown in Fig. 2 of the drawings, in which position the quarter-slide is open and the slots of higher denomination closed, the link 180 will rock the rod 172 and its two pins 176 and 177 will engage the lugs 178 and 179 and elevate the two deliverer-controllers 116 and 114, and the rear end of said key-lever will elevate the controllers 117 and 118 as before described. In the latter operation the arm 175 will not operate the arm 156, since the rod 172 was slid longitudinally when the slide 158 was operated. When the 30+ key is depressed, its rear end will elevate the twenty-five-cent-deliverer controller 118, and consequently the second five-cent-deliverer controller 117, since the two are rigidly connected. When the 40+ key-lever is depressed, its rear end elevates a U-shaped bail 184, (see Figs. 3, 8, and 10,) which is pivoted upon the end 123ª of the shaft 123 and disposed under the rear portions of the lower ends of the controllers 118, 117, and 116, as seen in Figs. 10 and 11 of the drawings. It will be seen that when this bail is elevated it will move said controllers to an inoperative position. The 50+ key-lever elevates the half-dollar-deliverer controller 119, as shown. (See Fig. 10.) When the 60+ key is depressed, its rear end will elevate the second dime-controller 116 and also the fifty-cent or half-dollar controller 119 by means of the following connections: The rear end of said lever is loosely connected by a link 186 to a U-shaped bail 187, rigidly secured upon a rock-shaft 188, mounted in bearings 189 upon the inside of the casing in rear of the key-levers. Upon said shaft 188 is also provided an arm 190, which projects below a laterally and rearwardly projecting arm 191 upon the lower portion of the controller 119, so that when the shaft 188 is rocked by said key-lever through the link 186 and bail 187 the arm 190 will elevate the arm 191 and its controller 119. When the 70+ key is depressed, its rear end, which engages the controller 117, will elevate the same and also the controller 118, the two being connected by the crossbar, as previously explained. Said lever 70 + also elevates the 20 + key by means of a stop 197, secured upon the former and engaging the under side of the latter. The operation of the 20 + lever has been previously explained. The 70 + lever when depressed will also elevate the controller 119 by means of a link 198, similar in construction to the link 186 and the following parts 187, 188, 190, and 191. When the 80 + key is depressed, it will elevate the controllers 118 117 and also the controller 119 by means of a link 192, similar to the link 186, and the following parts 187, 188, 190, and 191. When the 90 + key is depressed, its rear end, which projects under offset portion 184$^a$ of the swinging bail 184, will elevate the same, and thereby move the controllers 116, 117, and 118 to an inoperative position. Said 90 + key will also elevate the fifty-cent-deliverer controller 119 by means of a projection 184$^b$, which is adapted to engage said controller, as shown. (See Figs. 10, 11, and 12.)

I will now describe the operative connections for the groups of key-levers 110, which group is only used when the cut-off 140 is in its lowered position and the deliverer-controllers in the position shown in Fig. 11 of the drawings. When the key-lever numbered 10 is depressed, its rear end engages a laterally-projecting arm 199 upon the rear side of the controller 115 to elevate the same to an inoperative position. (See Fig. 10.) When the key-lever numbered 20 is depressed, it will elevate the controller 116 by means of a laterally-projecting arm 200 upon the latter, and also the controller 116, by means of a pin 201, which projects laterally from the rear end of the said key-lever and which is adapted to engage the under side of the arm 199. When the key-lever numbered 30 is depressed, its rear end engages a laterally-projecting arm 202, secured upon the controllers 117 and 118 and operates said controllers. When the key-lever numbered 40 is depressed, its rear end elevates said arm 202, and hence the controllers 117 and 118, and also the controller 115, by means of an arm or bracket 203, which projects downwardly from the under side of the rear end of said lever, then laterally beneath the arm 202, which it is adapted to elevate when said lever is operated. When the lever numbered 50 is elevated, a pin 204 upon its rear engages one end 205 of a wire 206, which is loosely coiled about a rock-shaft 207, journaled in bearings 208, provided upon the interior of the casing. The other end 209 of said wire engages a radial arm 210, which projects between the key-levers numbered 10 and 60 and below the arm 199, which it is adapted to elevate. Said wire 206 is also bent to form two arms 211 and 212, which respectively engage the arms 200 and 202. By means of these connections just described it will be seen that the key-lever numbered 50 when operated will elevate the controllers 115, 116, 117, and 118. When the lever numbered 60 is depressed, its rear end will engage the arm 159 to elevate the controller 116, and by means of the U-shaped bail 187, the connects it to the U-shaped bail 187, the controller 119 will be elevated by reason of the parts 188, 190, and 191, previously described. When the key-lever numbered 70 is depressed, its rear end will engage the arm 200 and elevate the controller 115, and a U-shaped arm of a bracket 214, similar in construction to the arm 203, will engage the arm 199 and elevate the controller 116. Said lever is similarly connected by a link 215 to the U-shaped bail 187, so that the controller 119 will also be elevated when said lever is depressed. When the key-lever numbered 80 is depressed, its rear end engages the arm 202, which elevates controllers 117 and 118, and the link 216, which connects it to the bail 187, will cause the controller 119 to be elevated. When the key-lever numbered 90 is depressed, its rear end will engage the arm 202 to elevate the controllers 117 and 118, and a pin 217, which projects laterally from the rear end of said lever will engage an arm 218, projecting radially from the rock-shaft 207. Said pin 217 will rock the arm 218, the shaft 207, and its other arm 210 to elevate the arm 199 and its controller 116. Said lever is also connected by a link 219 to the bail 187, so that the controller 119 will also be elevated when the 90 lever is operated. When the lever numbered 100 is depressed, a stop or pin 220 upon its rear end will engage the arm or end 205 of the wire 206, and the latter, through its arms 209, 211, and 212, will elevate the controllers 116, 115, 117, and 118. The key-lever is also connected by a link 221 to the bail 187, so that the controller 119 will also be elevated.

The operation of the machine is as follows: The crank-handle 12 when rotated will cause the coin-receiving disks 13 to revolve and the coin-deliverer operators 36 to reciprocate, but the other parts of the machine will not be operated until a coin is deposited. When a coin is deposited in its proper slot in the bar 10 and the crank 12 is then turned, the coin will be carried around through one of the channeled bars 92 and conductors 90 by one of the disks 13 and then deposited in its proper coin-tube in the holder 34. (See Figs. 4 and 5.) The coin in passing the trip-roller 94 will operate one of the levers 88, and the latter will swing its connector 79 or a series of said connectors downwardly to lock the proper number of coin-feeders 35 to their respective operators 36. It will be observed that the levers 88 and connectors 79 are so arranged that when one of said levers is operated it will simultaneously operate its own connector and all of the connectors below the latter, but none above it, so that the amount of money fed to the deliverers by the feeders varies according to the value of the coin deposited in the machine. It will also be noted that owing to the shape of the cam 72, which operates the feeder-operators 36, the latter, and hence the feeders 35, will remain quiet at the end of each reciprocation, the small curved inner portion of the cam permitting the levers 88 and connectors 79 to be operated before starting the feeders and feeder-operators, the larger curved outer portion serving to permit the tilting deliverers 45 to remove the coins from the pockets 59 in the feeders and the two side portions of the cam serving to move the operators forwardly and rearwardly. As the feeder-operators 36 are moved forwardly they will carry a certain number of feeders 35 along with them, and the coins in the pockets 59 of the feeders will be moved into their respective deliverers 45, provided the latter are in their lowered position. During the continued forward movement of the feeder the pins 60 upon the same will coact with the cam-slots 109 in the deliverers 45 and tilt the same to the position shown in Fig. 5 of the drawings in order to permit the coins in them to slide by gravity into the coin-receiving trough 9. As the feeders 35 move rearwardly the deliverers, which are tilted, will be returned to their normal positions. (See Fig. 4.) Those feeders which were not relieved of their coins owing to the fact that their deliverers were raised to an inoperative position will return the same to the coin-tubes. When it is desired to obtain change equaling in value the value of the coin deposited, no keys are depressed, and as a result the proper number of coin-feeders will be locked to their operators and the proper number of feeders will deliver the coins. It will be understood that either the deliverer of the first dime-feeder or the deliverers of the first nickel and the five one-cent feeders will be raised to an inoperative position, according to the position of the cut-off device 140. By reason of this fact the ten cents in excess of the value of the deposited coin in all values above ten cents, which is fed out of the coin-holder by the feeders, will not be discharged from the machine. For instance, if change for a half-dollar is desired it is deposited in the registering slots 159 and 27 and the crank 12 is turned, whereupon all the coin-feeders below the fifty-cent feeder will be operated and coins equivalent in value to sixty cents will be carried out of the coin-holder; but since either the deliverer of the first dime-feeder or the deliverers of the first nickel and the five one-cent feeders will be in an inoperative position, according to the position of the cut-off device 140, only coins to the value of fifty cents will be delivered. If pennies are desired, the cut-off device must be in its raised position, and as a result a quarter, a dime, two nickels, and five pennies will be discharged by the deliverers. If pennies are not desired, the cut-off device 140 must be in its lowered position, (shown in dotted lines in Figs. 8 and 9,) and as a result a second dime will be delivered in place of the five pennies and one of the nickels just mentioned. By means of this cut-off device change may be made with or without pennies or one-cent pieces, as desired. If it is desired to deduct a certain amount from the coin deposited, the purchase-keys of the proper groups equaling the amount it is desired to deduct are depressed before the crank 12 is turned. These keys, as previously described, will raise certain of the deliverers to an inoperative position, so that the coins which are fed out of the holder by the corresponding feeders will be returned to the holders when the crank-handle has made a complete revolution. Hence only the coins equal in value to the difference between the value of the keys depressed and the value of the coin deposited will be delivered.

From the foregoing description, taken in connection with the accompanying drawings, the construction and operation of the invention will be readily understood without requiring a more extended explanation.

I wish it understood that I do not limit myself to the construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. The combination of a normally idle operating-key, a coin-deliverer controller, a coin-slot guard, and means operated by said guard to connect the said deliverer-controller to said normally idle key for operation thereby.

2. A change-making machine having coin-deliverer controllers, operating-keys, means to connect them to certain of the controllers, and means to throw said keys out of operation and to simultaneously operate certain other of the controllers.

3. A machine of the character described comprising coin-holding means, tilting coin-deliverers, means for feeding coins from said holding means to said deliverers and means for controlling the operation of said coin-deliverers, substantially as described.

4. A machine of the character described comprising coin-holding means, vertically-movable coin-deliverers, means for feeding coins from said holding means to said deliverers, and means for moving said deliverers to an inoperative position, substantially as described.

5. A machine of the character described comprising coin-holding means vertically-movable coin-deliverers, and means for elevating one or more of said deliverers out of the paths of their respective coin-feeding means, substantially as described.

6. A machine of the character described comprising coin-holding means, coin-feeding means, vertically-movable coin-deliverers, and a key-lever for elevating one of said deliverers out of the path of its coin-feeding means, substantially as described.

7. A machine of the character described comprising coin-holding means, coin-feeding means, vertically-movable coin-deliverers, and a key-lever for elevating one or more of said deliverers out of the paths of their respective coin-feeding means, substantially as described.

8. A machine of the character described comprising coin-holders, coin-feeders, movable coin-deliverers, means operated by said coin-feeders for actuating said coin-deliverers, and means for preventing the operation of said coin-deliverers by said coin-feeders, substantially as described.

9. A machine of the character described comprising coin-holders, coin-feeders, movable coin-deliverers, means operated by said coin-feeders for actuating said coin-deliverers, and means for moving said coin-deliverers out of the path of their actuating means, substantially as described.

10. A machine of the character described comprising coin-holders, coin-feeders, coin-deliverers movable angularly with respect to said coin-feeders, means carried by said coin-feeders for operating said coin-deliverers, and means for preventing the operation of one or more of said coin-deliverers, substantially as described.

11. A machine of the character described comprising coin-holders, coin-feeders, coin-deliverers movable angularly with respect to said coin-feeders, means carried by said coin-feeders for operating said coin-deliverers and means for moving one or more of said coin-deliverers out of the path of said operating means, substantially as described.

12. In a machine of the class described, the combination of a coin-holder, a movable coin-deliverer, a movable coin-feeder, said feeder and deliverer having coacting means whereby the latter may be operated by the former, a feeder-operator, coin-controlled means to connect said feeder-operator and said feeder, and means to prevent the operation of the coin-deliverer by the coin-feeder.

13. In a machine of the character described, the combination of a tilting coin-deliverer, a sliding coin-feeder to carry a coin thereto, and coacting means for tilting the deliverer after the coin has been carried thereto by the feeder.

14. In a machine of the character described, the combination of a tilting coin-deliverer, a sliding coin-feeder coacting therewith, and a cam-and-pin connection between said feeder and said deliverer for tilting said deliverer when the feeder is moved in one direction and restoring the same to its normal position when said feeder is moved in the opposite direction, substantially as described.

15. In a machine of the character described, the combination of a tilting coin-deliverer, a sliding coin-feeder coacting therewith, said feeder and deliverer having coacting means for operating the latter and means for preventing the operation of said deliverer, substantially as described.

16. The combination of a coin-holder, a sliding coin-feeder, a tilting coin-deliverer, fed and tilted by the coin-feeder, to deliver a coin, and means to prevent the tilting of the deliverer by the feeder.

17. In a machine of the character described, the combination of a coin-feeder, a movable element, a tilting coin-deliverer mounted upon said element to coact with said feeder, and a stop for limiting the tilting movement of said deliverer, substantially as described.

18. In a machine of the character described, the combination of a coin-feeder, a movable element, a tilting coin-deliverer mounted upon said element to coact with said feeder, means upon said feeder for actuating said deliverer and a key-lever for operating said element to move said deliverer out of the path of its operating means, substantially as described.

19. In a machine of the character described, the combination of a coin-holder, a coin-deliverer, a coin-feeder for feeding coins from said holder to said deliverer, a sliding feeder-operator and means for connecting and disconnecting said feeder-operator to and from said feeder, substantially as described.

20. In a machine of the character described, the combination of a coin-holder, a coin-deliverer, a coin-feeder for feeding coins from said holder to said deliverer, a sliding feeder-operator, means for moving said feeder-operator, and means for imparting the motion of said feeder-operator to said feeder, substantially as described.

21. In a machine of the character described, the combination of a coin-holder, a coin-deliverer, a coin-feeder for feeding coins from said holder to said deliverer, a feeder-operator, and coin-controlled means for connecting said feeder and feeder-operator, substantially as described.

22. In a machine of the character described, the combination of a coin-deliverer, a feeder therefor, a feeder-operator, a swinging element for connecting said feeder and feeder-operator together, and coin-controlled means 23. The combination of a coin-feeder mounted for sliding movement, a feeder-operator mounted for sliding movement, means to actuate the feeder-operator, a swinging element to connect said feeder and feeder-operator together for simultaneous movement, a spring to normally retain the swinging element in disengaged position with respect to the feeder and feeder-operator, and a check-actuated lever to engage the swinging element with the feeder and feeder-operator and cause said feeder and feeder-operator to move in unison.

24. In a machine of the character described, the combination of a sliding coin-feeder, provided with a slot, a sliding feeder-operator provided with a slot, a movable element adapted to enter said slots to lock said feeder and feeder-operator together, and means for operating said element, substantially as described.

25. In a machine of the character described, the combination of a coin-feeder, a feeder-operator, a connector for said feeder and feeder-operator, a rotary element having a coin or check receiving pocket, a lever coacting with said element and adapted to actuate said connector, and a trip upon said lever adapted to be engaged by a coin or check in the pocket of said element, substantially as described.

26. In a machine of the character described, the combination of a coin-holder, a coin-conductor leading thereto, a rotary coin-receiving element, and a swinging coin-conducting element coacting with said rotary coin-receiving element and communicating with said coin-conductor, substantially as described.

27. In a machine of the character described, the combination of a coin-holder, a coin-conductor leading thereto, a coin-receiving disk formed with a coin-pocket in its periphery, a troughed arc-shaped coin-conducting element, coacting with said disk and said conductor, and a trip-roller in said troughed arc-shaped element, substantially as described.

28. In a machine of the character described, the combination of a suitable frame or casing formed with a coin-slot, a coin-guide upon the inner side of said frame or casing adjacent to said slot, a coin-receiving disk mounted adjacent to said guide and formed in its periphery with a coin-pocket, whereby a coin of a predetermined size will be retained in said pocket by said guide, and a coin of a smaller size than that designed to be inserted in said slot, will be permitted to fall out of said pocket, said slot preventing coins of larger denomination from being placed in said coin-pocket, substantially as described.

29. In a machine of the character described, the combination of a disk having a coin-pocket in its periphery, a troughed arc-shaped operating-lever coacting therewith, and a trip-roller journaled in said troughed lever and adapted to be engaged by a coin in the pocket of said disk, substantially as described.

30. In a machine of the character described, the combination of a coin-feeder, a feeder-operator therefor, a shaft, a disk upon said shaft formed with a cam-slot, a lever connected to said feeder-operator and pivoted intermediate its ends, a link connected to said lever and formed with a forked end to engage said shaft, and a stud upon said link to travel in said cam-slot, substantially as described.

31. In a machine of the character described, the combination of a sliding coin-feeder formed with a coin-pocket of less width than the diameter of said coin, and a tilting coin-deliverer adapted to pick said coin from said pocket, substantially as described.

32. A change-making machine having a series of coin-deliverer controllers of inferior value, a series of operating-keys therefor, means to enable any desired number of the controllers to be simultaneously operated by an appropriate key, a substitute coin-deliverer controller of a value equal to that of the sum of the inferior-value-coin-deliverer controllers, and means to alternately put the inferior-value-coin-deliverer controller and the substitute coin-deliverer controller into operation.

33. A change-making machine having a series of coin-deliverer controllers of inferior value, operating-keys therefor, a substitute coin-deliverer controller of a value equal to that of the sum of the inferior-value-coin-deliverer controllers, a series of coin-deliverer controllers of superior value, two alternately-operative superior-value series of keys for said superior-value-coin-deliverer controllers, and means to put one of the superior-value series of keys and either the inferior-value series of keys or the substitute coin-deliverer controller out of operation.

34. A change-making machine having a series of coin-deliverer controllers of inferior value, a series of inferior-value operating-keys therefor, means to enable any desired number of the controllers to be simultaneously operated by an appropriate key, a substitute coin-deliverer controller of a value equal to that of the sum of the inferior-value-coin-deliverer controllers, a series of coin-deliverer controllers of superior value, two alternately-operative superior-value series of keys for said superior-value-coin-deliverer controllers, and means to put one of the superior-value series of keys and either the inferior-value series of keys or the substitute coin-deliverer controller out of operation.

35. In a machine of the character described, the combination of a suitable support, a crank-shaft mounted therein, a series of coin-receiving elements upon said shaft for coins of different denominations, a holder for coins of different denominations, conductors for directing the coins placed in said elements into said holder, deliverers for the coins in said holder, coin-feeders for said deliverers, operators for said feeders, drive connections between said shaft and said operators, coin-actuated means coacting with said coin-receiving elements for locking said feeders to said operators, and means to receive the coins discharged from said deliverers, substantially as described.

36. A change-making machine having two groups of purchase-keys, one for use when a certain value or multiples thereof are to be deducted from a coin deposited in the machine and the other for use when intermediate values are to be deducted, and means for preventing the use of more than one of said groups at the same time.

37. A change-making machine having two groups of purchase-keys, one for use when a certain value or multiples thereof are to be deducted from a coin deposited in the machine and the other for use when intermediate values are to be deducted and means for rendering one of said groups inoperative.

38. A change-making machine having two groups of purchase-keys, one for use when a certain value or multiples thereof are to be deducted from a coin deposited in the machine and the other for use when intermediate values are to be deducted and means for simultaneously throwing one of said groups into operation and the other out of operation.

39. A change-making machine having two groups of purchase-keys, one for use when a certain value or multiples thereof are to be deducted from a coin deposited in the machine and the other for use when intermediate values are to be deducted, and a swinging element for preventing the use of one or the other of said groups.

40. In a machine of the character described, the combination of a superior-coin-deliverer controller, a plurality of inferior-coin-deliverer controllers, a swinging element coacting with said superior-coin-deliverer controller, key-levers for operating one or more of said inferior-coin-deliverer controllers, and key-levers for operating said swinging element and a predetermined number of said inferior-coin-deliverer controllers, substantially as described.

41. In a machine of the character described, the combination of a dime-deliverer controller, a nickel-deliverer controller, five one-cent-deliverer controllers, and means for alternately moving said dime-deliverer controller or said nickel and one-cent deliverer controllers to an inoperative position, substantially as described.

42. In a machine of the character described, the combination of a dime-deliverer controller, a nickel-deliverer controller, five one-cent-deliverer controllers, and means for simultaneously moving said dime-deliverer controller into an operative position and said nickel and one-cent deliverer controllers to inoperative positions, substantially as described.

43. In a machine of the character described, the combination of a dime-deliverer controller, a nickel-deliverer controller, five one-cent-deliverer controllers, and cams for simultaneously moving said dime-deliverer controller into an operative position and said nickel and one-cent deliverer controllers to inoperative positions.

44. In a change-making machine the combination of a suitable frame, a swinging bracket mounted thereon, and a removable coin-holder slidably mounted upon said bracket, substantially as described.

In testimony whereof I have hereunto set my hand in presence of two subscribing witnesses.

THOMAS S. WILKES.

Witnesses:
    J. H. LANGSTON,
    J. M. CREIGHTON.